(12) United States Patent
Ranson et al.

(10) Patent No.: US 10,742,348 B2
(45) Date of Patent: Aug. 11, 2020

(54) TRANSPORT DATA REDUCTION FOR DAS SYSTEMS

(71) Applicant: CommScope Technologies LLC, Hickory, NC (US)

(72) Inventors: Christopher Goodman Ranson, Concord, VA (US); Fred William Phillips, Forest, VA (US); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 57 days.

(21) Appl. No.: 15/791,208

(22) Filed: Oct. 23, 2017

(65) Prior Publication Data
US 2018/0109351 A1 Apr. 19, 2018

Related U.S. Application Data

(60) Continuation of application No. 14/676,325, filed on Apr. 1, 2015, now Pat. No. 9,800,369, which is a
(Continued)

(51) Int. Cl.
*H04L 1/00* (2006.01)
*H04B 7/022* (2017.01)
(Continued)

(52) U.S. Cl.
CPC .......... *H04L 1/0006* (2013.01); *H04B 7/022* (2013.01); *H04B 7/0413* (2013.01); *H04B 7/08* (2013.01);
(Continued)

(58) Field of Classification Search
CPC ..... H04L 1/0006; H04L 1/0015; H04L 69/04; H04J 3/02; H04W 28/06; H04B 7/022; H04B 7/0413; H04B 7/08
See application file for complete search history.

(56) References Cited

U.S. PATENT DOCUMENTS 4,759,038 A * 7/1988 Takahashi ........... H03M 7/3053
329/311
5,434,948 A 7/1995 Holt et al.
(Continued)

FOREIGN PATENT DOCUMENTS

CN 1745560 A 3/2006
CN 101103552 A 1/2008
(Continued)

OTHER PUBLICATIONS

China Patent Office, "First Office Action for CN Application No. 201180037371.1", "from Foreign Counterpart to U.S. Appl. No. 13/716,623", dated Dec. 18, 2014, pp. 1-11, Published in: CN.
(Continued)

*Primary Examiner* — Min Jung
(74) *Attorney, Agent, or Firm* — Fogg & Powers LLC

(57) ABSTRACT

An endpoint element of a distributed antenna system includes processing circuitry configured for processing a plurality of digital signals for conditioning the signals and compression circuitry configured for compressing at least one of the digital signals according to a compression scheme to yield at least one compressed digital signal and compression settings. The digital signals are combined into a single digital stream and combined and time division multiplexed onto a serial data link with the compression settings. The digital signals are also transmitted with compression settings to another endpoint element over the serial data link.

20 Claims, 8 Drawing Sheets

Related U.S. Application Data continuation of application No. 14/087,805, filed on Nov. 22, 2013, now Pat. No. 9,014,256, which is a division of application No. 13/716,623, filed on Dec. 17, 2012, now Pat. No. 8,594,223, which is a continuation of application No. PCT/US2011/041076, filed on Jun. 20, 2011.

(60) Provisional application No. 61/356,097, filed on Jun. 18, 2010.

(51) Int. Cl.

| | | |
|---|---|---|
| *H04B 7/0413* | (2017.01) | |
| *H04B 7/08* | (2006.01) | |
| *H04L 29/06* | (2006.01) | |
| *H04J 3/02* | (2006.01) | |
| *H04W 28/06* | (2009.01) | |

(52) U.S. Cl.
CPC .............. *H04J 3/02* (2013.01); *H04L 1/0015* (2013.01); *H04L 69/04* (2013.01); *H04W 28/06* (2013.01)

(56) References Cited

U.S. PATENT DOCUMENTS

| | | | |
|---|---|---|---|
| 5,642,463 | A | 6/1997 | Nakano et al. |
| 6,054,896 | A * | 4/2000 | Wright ................. H03F 1/0294 330/149 |
| 7,009,533 | B1 | 3/2006 | Wegener |
| 7,035,671 | B2 | 4/2006 | Solum |
| 7,054,378 | B2 | 5/2006 | Walton et al. |
| 7,093,039 | B2 | 8/2006 | Kume et al. |
| 7,103,377 | B2 | 9/2006 | Bauman et al. |
| 7,336,598 | B2 | 2/2008 | Kakura |
| 7,394,410 | B1 | 7/2008 | Wegener |
| 7,512,419 | B2 | 3/2009 | Solum |
| 7,539,509 | B2 | 5/2009 | Bauman et al. |
| 7,974,244 | B2 | 7/2011 | Hermel |
| 8,023,457 | B2 | 9/2011 | Kotecha et al. |
| 8,174,428 | B2 | 5/2012 | Wegener |
| 8,225,370 | B2 | 7/2012 | Ohata et al. |
| 8,594,223 | B2 | 11/2013 | Ranson et al. |
| 8,780,689 | B2 | 7/2014 | Chakraborty et al. |
| 9,014,256 | B2 | 4/2015 | Ranson et al. |
| 9,800,369 | B2 | 10/2017 | Ranson et al. |
| 2002/0045987 | A1 | 4/2002 | Ohata et al. |
| 2003/0041199 | A1 | 2/2003 | Kume et al. |
| 2003/0090994 | A1 | 5/2003 | Kakura |
| 2005/0163252 | A1 | 7/2005 | McCallister et al. |
| 2009/0075644 | A1 | 3/2009 | Hermel |
| 2009/0080584 | A1 | 3/2009 | Hamano et al. |
| 2010/0254489 | A1 | 10/2010 | Citta |
| 2010/0304770 | A1 | 12/2010 | Wietfeldt et al. |
| 2013/0071000 | A1 * | 3/2013 | Takagi ................. A61B 6/4233 382/132 |

FOREIGN PATENT DOCUMENTS

| | | | |
|---|---|---|---|
| EP | 0984646 | A2 | 3/2000 |
| WO | 2009021359 | A2 | 2/2009 |
| WO | 2009151893 | A2 | 12/2009 |
| WO | 2011060117 | A2 | 5/2011 |
| WO | 2011160117 | A2 | 12/2011 |

OTHER PUBLICATIONS

China Patent Office, "Second Office Action for CN Application No. 201180037371.1", "from Foreign Counterpart to U.S. Appl. No. 13/716,623", dated Oct. 8, 2015, pp. 1-15, Published in: CN.

Chinese Patent Office, "Third Office Action from CN Application No. 201180037371.1", "from Foreign Counterpart to U.S. Appl. No. 13/716,623", dated Feb. 6, 2016, pp. 1-11, Published in: CN.

Eleven-page M. L. Chebolu and S. K. Jayaweera, "Integrated Design of STBC-Based Virtual-MIMO and Distributed Compression in Energy-Limited Wireless Sensor Networks"; 2nd European Workshop on Wireless Sensor Networks (EWSN 05); Istanbul, Turkey; Jan. 31-Feb. 2, 2005.

European Patent Office, "Communication under Rule 71(3) for EP Application No. 11728987.6", Foreign Counterpart to U.S. Appl. No. 13/716,623, dated May 15, 2017, pp. 1-44, Published in: EP.

European Patent Office, "Extended European Search Report for EP Application No. 17198890.0", "Foreign Counterpart to U.S. Appl. No. 14/087,805", dated Jan. 25, 2018, pp. 1-8, Published in: EP.

Jianxin Dai et al., "A New Antenna Selection Scheme for Correlated MIMO Channels", "2010 2nd International Conference on Future Computer and Communication (ICFCC)", May 21, 2010, pp. V2-404-V2-407, vol. 2, Publisher: IEEE, Published in: Piscataway, NJ.

Nine-Page Jim Chou, Dragan Petrovic, and Kannan Ramchandran; "A Distributed and Adaptive Signal Processing Approach to Reducing Energy Consumption in Sensor Networks"; IEEE INFOCOM 2003.

Six-page Marsch, P., et al; "On Uplink Network MIMO under a Constrained Backhaul and Imperfect Channel Knowledge"; Communications, 2009, ICC '09; IEEE International Conference on; IEEE, Pscataway, NJ, USA, dated Jun. 14, 2009, pp. 1-6, XP301506246; ISBN 978-1-4244-3435-0.

Ten-page Written Opinion dated Nov. 16, 2011 for US/PCT/2011/041076.

United States Patent and Trademark Office, "Notice of Allowance", "from U.S. Appl. No. 13/716,623", dated Jul. 24, 2013, pp. 1-14, Published in: US.

United States Patent and Trademark Office, "Notice of Allowance", "from U.S. Appl. No. 14/087,805", dated Dec. 2, 2014, pp. 1-8, Published in: US.

United States Patent and Trademark Office, "Notice of Allowance for U.S. Appl. No. 14/676,325", dated Feb. 3, 2017, pp. 1-9, Published in: U.S.

United States Patent and Trademark Office, "Notice of Allowance for U.S. Appl. No. 14/676,325", dated Jun. 21, 2017, pp. 1-13, Published in: U.S.

United States Patent and Trademark Office, "Office Action for U.S. Appl. No. 14/676,325", dated Sep. 21, 2016, pp. 1-21, Published in: U.S.

European Patent Office, "Communication pursuant to Article 94(3) from EP Application No. 17198890.0 dated Jan. 15, 2019", from Foreign Counterpart to U.S. Appl. No. 13/716,623, dated Jan. 15, 2019, pp. 1-8, Published: EP.

European Patent Office, "Communication pursuant to Article 94(3) from EP Application No. 17198890.0", from Foreign Counterpart to U.S. Appl. No. 13/716,623, dated Dec. 4, 2019, pp. 17, Published: EP.

* cited by examiner

TRANSPORT DATA REDUCTION FOR DAS SYSTEMS

RELATED APPLICATIONS

This Application is a Continuation Application of U.S. patent application Ser. No. 14/676,325, filed Apr. 1, 2015, entitled "TRANSPORT DATA REDUCTION FOR DAS SYSTEMS"; which application is a Continuation Application of U.S. patent application Ser. No. 14/087,805, filed Nov. 22, 2013, now Issued U.S. Pat. No. 9,014,256, issued on Apr. 21, 2015, entitled "TRANSPORT DATA REDUCTION FOR DAS SYSTEMS"; which application is a Divisional Application of U.S. patent application Ser. No. 13/716,623, filed Dec. 17, 2012, now Issued U.S. Pat. No. 8,594,223, issued on Nov. 26, 2013, entitled "TRANSPORT DATA REDUCTION FOR DAS SYSTEMS"; which application is a continuation of International PCT Application No. PCT/US2011/041076, filed Jun. 20, 2011, entitled "DIGITAL DISTRIBUTED ANTENNA SYSTEM WITH IMPROVED DATA TRANSMISSION FEATURES"; which application claims priority to U.S. Provisional Application Ser. No. 61/356,097, filed Jun. 18, 2010, entitled "TRANSPORT DATA REDUCTION FOR DAS SYSTEMS". All applications and issued patents are incorporated herein by reference in their entireties.

BACKGROUND

Signal repeating systems like distributed antenna systems (DAS) are commonly used to extend wireless coverage into buildings, between buildings, in tunnels, and into various other areas, where RF signal penetration from base stations is limited. Antenna units and antennas are distributed through a building and are optimally placed to provide ubiquitous coverage inside the building or other areas.

Digital distributed antenna systems often consist of one or more master units (MU) that are connected to various base transceiver stations (BTS) of various cellular providers employing different air interfaces. A series of physically separated remote antenna units (RAUs) are each connected to an MU via a digital serial link. The MU down converts and digitizes (ADC) the Downlink (DL) signals from the base station(s) and time division multiplexes (TDM) the digital data into frames that are then transmitted over appropriate serial data links to the RAUs. The RAUs digital-to-analog convert (DAC) the digital data and up convert the respective analog signals to the required RF format for transmission to fixed or mobile subscribers in the system. In a similar manner, the RAUs down-convert and digitize Uplink (UL) signals from the fixed/mobile users and transmit the digitized data back to the MU. The MU digital-to-analog may convert the signals from the mobile/fixed subscribers and up-convert them to the appropriate RF format for transmission to the various BTSs or the MU may forward the digital data directly.

While such digital DAS systems provide desirable coverage into buildings and sheltered areas, the digital serial link between the MU and RAUs can present a traffic bottleneck for a Digital DAS system. The data rate on the digital serial link is often limited to around 10 Gbps due to the cost and the physical media that is used (e.g. optical fiber or twisted pair cable) for the serial link. To overcome this limitation, one solution is to implement multiple digital serial links arranged in parallel to transmit the digitized RF data between the MU and RAUs. However, as may be appreciated, using multiple digital serial links is expensive and can significantly increase installation costs for wideband systems. Furthermore, the ability to upgrade or add additional parallel serial links to existing legacy DAS installations may not be available, or may be prohibitively expensive.

Another factor that further presents an issue with respect to signal traffic is the implementation of Multiple-Input Multiple-Output (MIMO) systems utilizing multiple signal streams for improved communications. Such MIMO systems incorporate multiple signals from the base stations, as well as multiple antennas, such as at the RAUs that are utilized within a MIMO system. Those multiple and individual MIMO signals must be handled over the serial link of a digital DAS System, thus, increasing the overall traffic that must be handled.

Accordingly, it is desirable to improve communication signal traffic flow in a digital DAS system, and particularly to address system bottlenecks associated with a digital serial link. Furthermore, it is desirable to enhance signal traffic within a digital DAS system that is implemented for handling MIMO signals.

DESCRIPTION OF THE INVENTION

Figure 1:
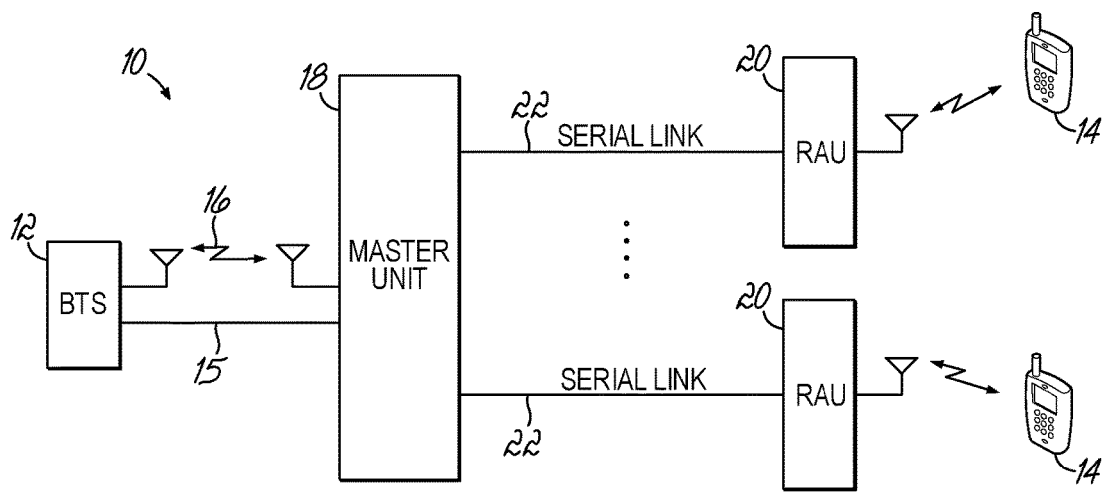
FIG. 1 is a block diagram of a distributed antenna system (DAS) for a single input single output SISO system.
Figure 2:
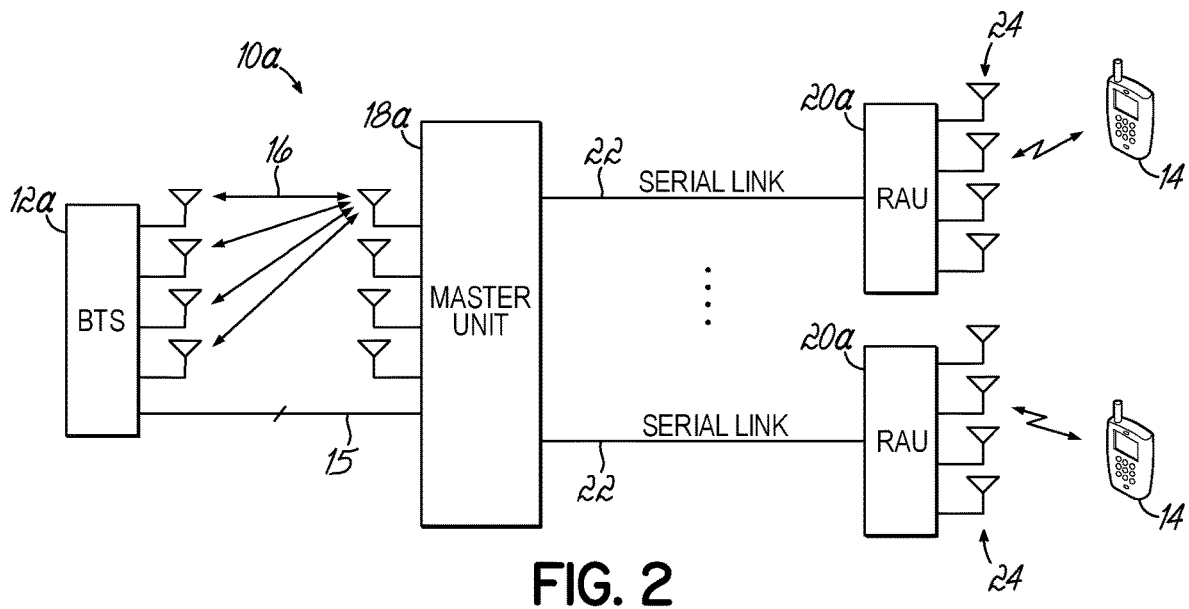
FIG. 2 is a block diagram of a distributed antenna system (DAS) for a multiple input multiple output MIMO system.

Mobile telecommunication systems, such as 3.5G and 4G standard systems, use Multiple-Input Multiple-Output (MIMO) antenna configurations for communicating with user equipment and devices, such as mobile phones. For a DAS system implemented in such an overall MIMO configuration, the MU and the RAUs handle multiple MIMO signal streams that often offer improved performance over conventional Single-Input Single-Output (SISO) systems. FIG. 1 shows a typical DAS system deployment for a SISO configuration. The DAS system handles traffic between one or more base stations 12, and user equipment 14. A base station, such as base station 12, communicates over a wired link 15, or over a wireless link 16, with the DAS system 10 that incorporates one or more master units 18, a plurality of remote antenna units, and a digital serial link 22 for remote antenna units 20. The serial link may be any suitable serial link for handling digital traffic, including a copper link, such as coaxial cable or twisted pair cable, or a fiber link, such as a suitable fiber-optic cable. Multiple logical links may be combined onto a serial link 22, and the serial link could be uni-directional or bi-directional. A logical link may be associated with a MIMO stream, a diversity stream, a band stream, or a base station stream, wherein the streams represent digital representations of RF signals. The master units 18 and remote antenna units 20 are considered the "endpoint" of the DAS system and interface with the desired downlink traffic from the base station 12 to the user equipment 14 is handled in one direction by the DAS system 10, and is uplink traffic from the user equipment 14 to the base station 12 is handled in the other direction. This type of deployment is common for standards including and prior to 3G without antenna diversity. In a MIMO configuration or a diversity configuration, a DAS system 10a uses multiple antennas at each endpoint that are spaced about ½ a wavelength apart or greater at either the MU or the RAU. FIG. 2 shows a typical DAS system deployment for 4×4 MIMO configurations. While a 4×4 MIMO configuration is illustrated in FIG. 2, other MIMO configurations, such as a 2×2 configuration, as discussed further herein below with reference to other Figures might, also be implemented. Therefore, the designation of MIMO corresponds to multiple antennas and multiple respective signals without limitation to the number of such antennas and signals. Referring to FIG. 2, a suitable base station 12a provides the multiple MIMO signals, which might be handled through multiple antennas in the wireless link 16, or through individual MIMO signals handled by the wired link 15. The MIMO DAS system 10a incorporates one or more suitable master units 18a, with multiple antennas and/or suitable circuitry for handling the multiple MIMO signals. The MIMO signals are transported through the serial links 22 to/from the remote antenna units 20a, and the signals are broadcast to the user equipment 14 through a plurality of antennas 24 at the remote antenna units 20a. Usually, for the full benefits of a MIMO configuration, the user equipment 14 must also implement multiple antennas (not shown).

In a MIMO DAS system, the RF MIMO signals, such as from each antenna, are digitized and transported separately on the serial link. For MIMO to be effective, the separate MIMO signals, such as those signals received at the multiple antennas of the DAS system 10a, should be de-correlated from each other. However, in a practical system, there is usually some correlation between the MIMO signals received on the multiple antennas used by either the MU 18a or the RAU 20a. The correlation is typically due to the layout and/or impact of the environment (e.g., indoor and/or outdoor environments) within which the DAS endpoints (MU, RAU) are configured and installed. In accordance with one aspect of the invention, the redundancy (i.e. correlation) of the received individual MIMO signals is exploited in such a way as to reduce the amount of data that is transported over the serial link in accordance with the invention. Various data compression mechanisms are used to compare the multiple MIMO receive signals and create new received signals such that uncorrelated data is handled without significant duplication of correlated data. The uncorrelated data is then sent over the serial data link. Any correlation between the multiple MIMO received signals is sent only once, as one of the MIMO signals and the correlated data is removed from the other signals. This effectively reduces the bandwidth requirements on the serial link. There are various ways of implementing this data compression, as discussed herein. The inventive methods used have minimal delay so as not to affect the overall system performance of the MIMO system.

Figure 3:
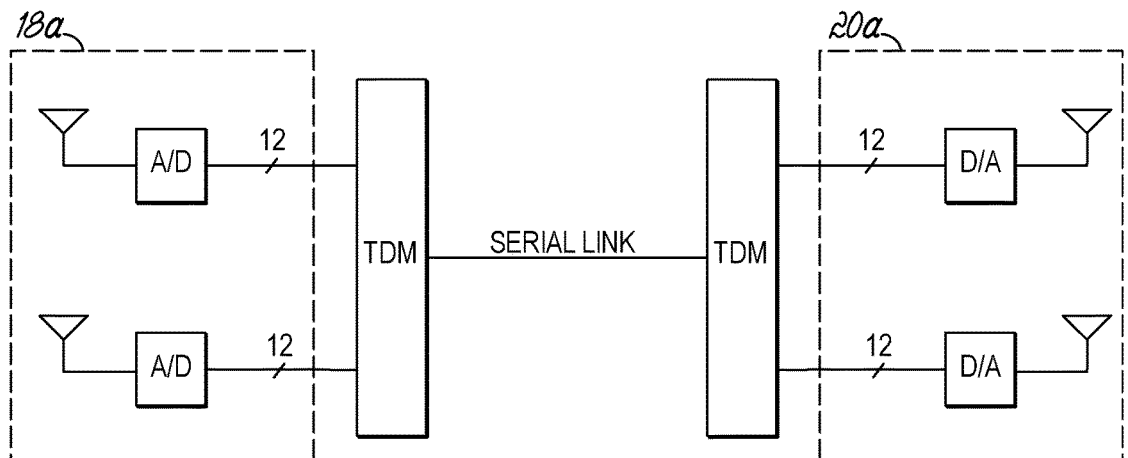
FIG. 3 is a block diagram of a DAS system for handling MIMO signals, showing the endpoints of the DAS system.

FIG. 3 illustrates how signals in a MIMO system are conventionally transmitted. In particular, FIG. 3 illustrates that the A/D conversion of the signal received at two antennas, such as at an MU 18a, may be converted from analog to digital, transmitted to time-division multiplexing circuitry, TDM module, then sent via digital serial link to the other end, such as an RAU 20a. Assuming the A/D sample rate is 100 MHz, for example, then the serial link for the 2×2 MIMO system of FIG. 3 uses a sample rate of approximately 100 MHz*12 bits*2=2.4 Gbps.

In one embodiment of the invention, the correlation of the individual MIMO signals received by the individual antennas can be exploited to compress the data to the TDM circuitry, and thus reduce the data to transmit between the RAU and the MU on the serial link.

Figure 4A:
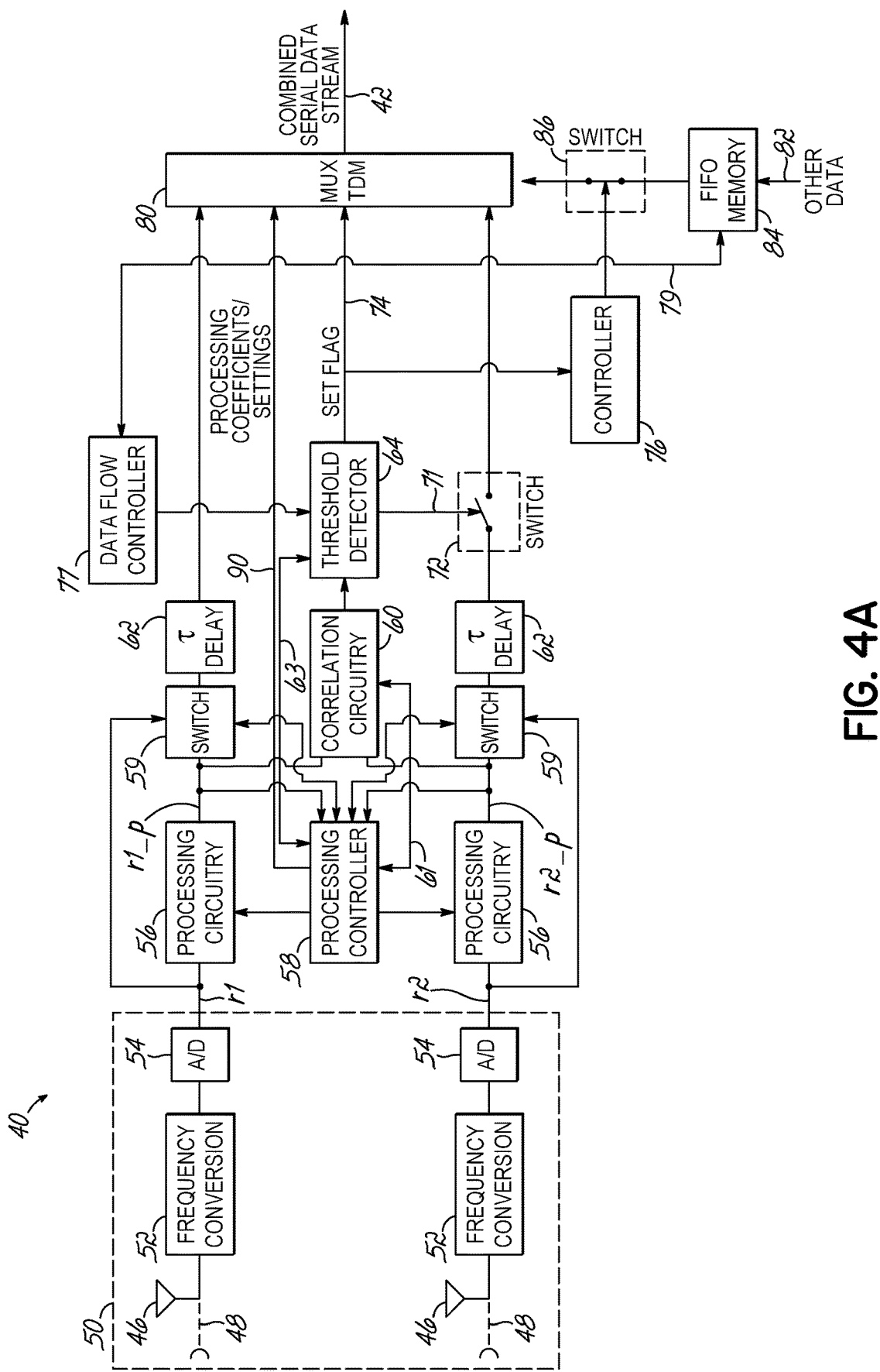
FIG. 4A is a block diagram off of a DAS endpoint for an embodiment of the invention.

In one embodiment of the invention, a determination is made with respect to the correlation between the multiple MIMO signal streams for more efficiently handling data in the DAS system. In FIG. 4A, a 2×2 MIMO system is illustrated, for example. Specifically, the front end circuitry 40 for an endpoint of such a MIMO system is illustrated. The front end circuitry 40 might be incorporated within an endpoint, such as a master unit or some other component. That endpoint 40 is connected by a serial data link 42 to appropriate back end circuitry 44 at another endpoint, such as a remote antenna unit (See FIG. 4B). It will be appreciated that the signal path illustrated in FIGS. 4A, 4B for signal transmission, such as in a downlink (DL) direction, will be duplicated for the other direction, such as in an uplink (UL) direction.

Figure 4B:
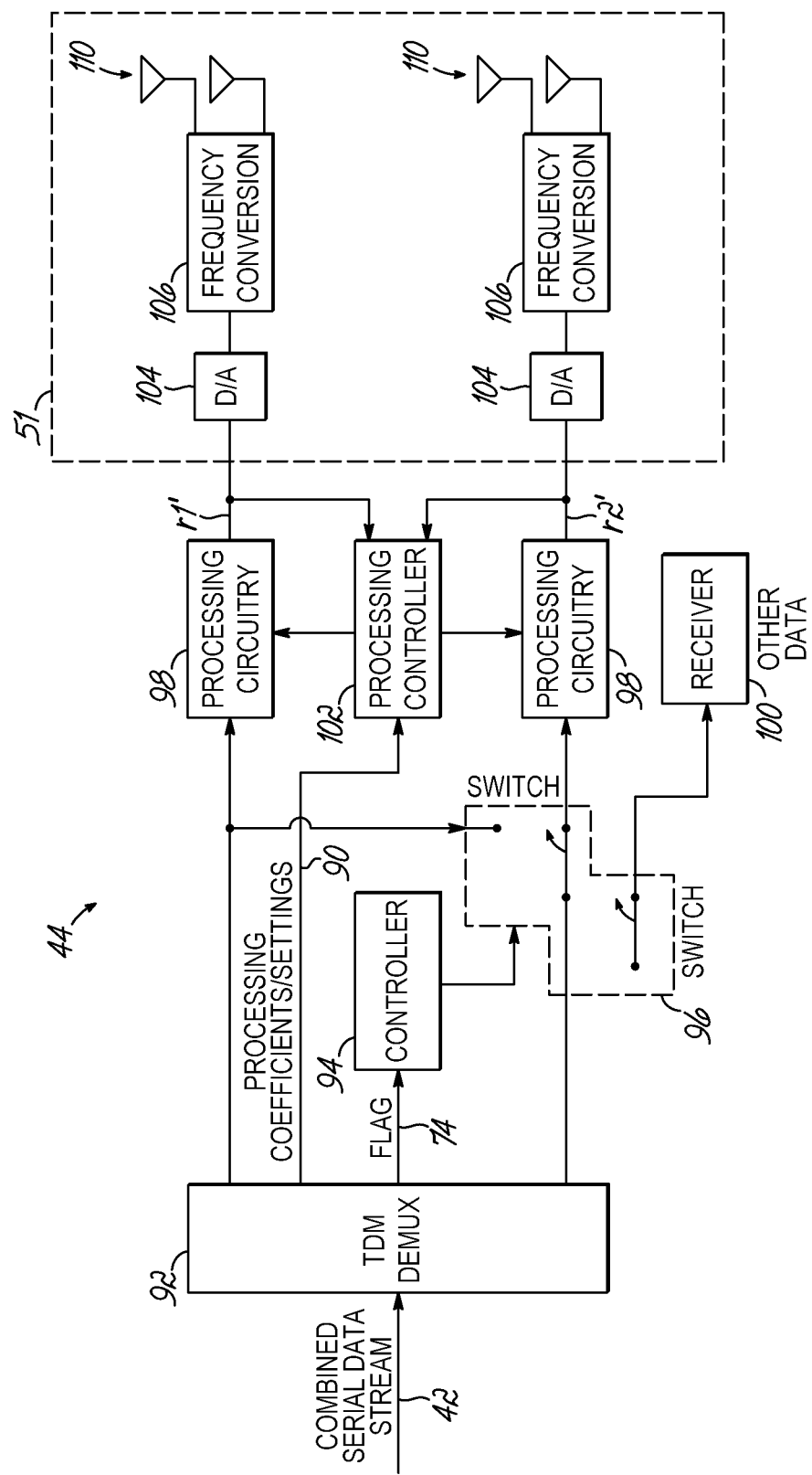
FIG. 4B is a block diagram of another DAS endpoint for the embodiment of the invention illustrated in FIG. 4A

The embodiment, as illustrated in FIGS. 4A and 4B, incorporates correlation between the multiple MIMO signal streams to determine if the MIMO signal data sent on the serial link may be reduced, and replaced with other data. More specifically, based upon times of significant correlation in the MIMO signals, it may only be desirable to send some subset of the MIMO signals on the serial data link 42. In a 2×2 MIMO system, for example, it may be desirable to send only one of the original MIMO signal streams when correlation is high. The normal time slots associated with the other MIMO signal stream might then be populated with "other" data.

The front end circuitry 40 might incorporate a direct digital I/Q link to a base station or a remote radio head, which provides the MIMO signals r1, r2. Alternatively, to receive r1, r2, the front end circuitry 40 may incorporate suitable uplink/downlink antennas 46 or a direct analog RF link 48 to a base station, as indicated by circuitry block 50. With an RF link, a signal is then downconverted by appropriate frequency conversion circuitry 52 and digitally-converted to a digital signal from analog with adequate signal processing circuitry 54 that may include digital downconversion, decimation, and filtering.

Referring to FIG. 4A, the MIMO signals r1 and r2 are then further processed by the front end circuitry 40 of the DAS endpoint, in accordance with the invention. Both streams r1 and r2 are directed to processing circuitry 56 controlled by a suitable processing controller 58 for conditioning the signals. The processing circuitry 56 combined with the processing controller 57, may include a configurable bandwidth filter, an adaptive filter, or more complex processing stage. The invention evaluates similarities between the signals and forms a similarity value or some other indication of the similarity of the signals that is compare against a threshold. In one embodiment of the invention, correlation it utilized for determining the similarity between the signals r1, r2. In alternative embodiments, other methods are used for evaluating and determining signal similarities. The main purpose of the processing circuitry 56 is to condition the individual data streams r1, r2 for optimal compression, pursuant to the invention. In one embodiment, the processing circuitry 56 is configured to scale the signal streams r1, r2 in both amplitude and phase. The signal streams are scaled toward each other for achieving a maximum correlation peak, when correlation exists between r1 and r2. The processed signal streams r1_p and r2_p are directed to correlation circuitry 60 where the signal streams are received as input, and a given sample size is correlated periodically. The correlation circuitry 60 might also be controlled by processing controller circuitry 58 via control lines 61. The sample size may be varied to maximize the instances in which the signal streams correlate well. Delay circuits 62 are implemented in the various paths to adapt to any delay invoked by the correlation circuitry 60. To that end, the delay introduced by the delay circuitry 62 might be varied.

Figure 5:
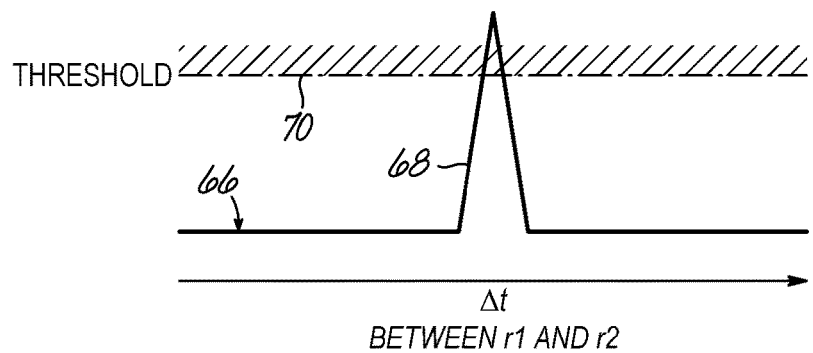
FIG. 5 is as signal diagram of a correlation signal peak.

The correlation value that is output from the correlation circuitry 60 is directed to threshold detector circuitry 64. The threshold detector circuitry 64 determines whether the correlation between the signal streams r1, r2 is strong, and particularly compares the correlation signal peak to a threshold to determine whether the correlation exceeds the threshold. Referring now to FIG. 5, correlation signal indicated as 66 may have a peak 68 when the correlation between the signal streams r1, r2 is strong. If a peak 68 exceeds a threshold 70, the invention will send only a subset of the multiple signal streams over the serial link. Specifically, referring to FIG. 4A, if the threshold detector indicates a correlation peak 68 that exceeds the threshold 70, then the second signal stream r2 is interrupted, such as by switch circuitry 72. Only signal r1 is sent. The switch circuitry 72 may be controlled by a control signal 71 from the threshold detector circuitry. Therefore, the signal stream r2 is not transmitted over the serial link 42. Instead, the second signal stream r2 is interrupted, a flag or flag information is set, as shown by output 74 from the threshold detector, and other non-MIMO data is then multiplexed onto the serial link in the time slots that would have occupied by the second MIMO signal stream r2 if the correlation had been below the threshold.

Referring again to FIG. 4A, a flag condition 74 is input to a switch controller 76 for controlling switch 86 for the introduction of additional data (i.e., non-r2 data) to the multiplexer circuitry 80 for time-division multiplexing the additional data onto the serial link 42. Additional data 82 might be directed through a FIFO memory block 84. Data flow controller circuitry 77 appropriately controls memory block 84 for multiplexing other data 82 onto the multiplexer 80 and the serial link 42. The FIFO memory block 84 can be utilized to buffer the additional data 82 at the time when no free slots are available on the combined serial data stream. If the FIFO memory buffer 84 becomes full, or for selected other reasons, as indicated through connection 79, the data flow controller circuitry 77 is appropriately configured to provide an override mechanism, such as through the threshold detector circuitry 64, to control switch 77 and interrupt the second stream signal r2 and allow the other data to be sent instead. To that end, the data flow controller circuitry 77, controller 76, threshold detector circuitry 64, and switching circuitry 72, 86 manage when to send the second stream r2 (low correlation), and when to send other data (high correlation or some other conditions).

Figure 6:
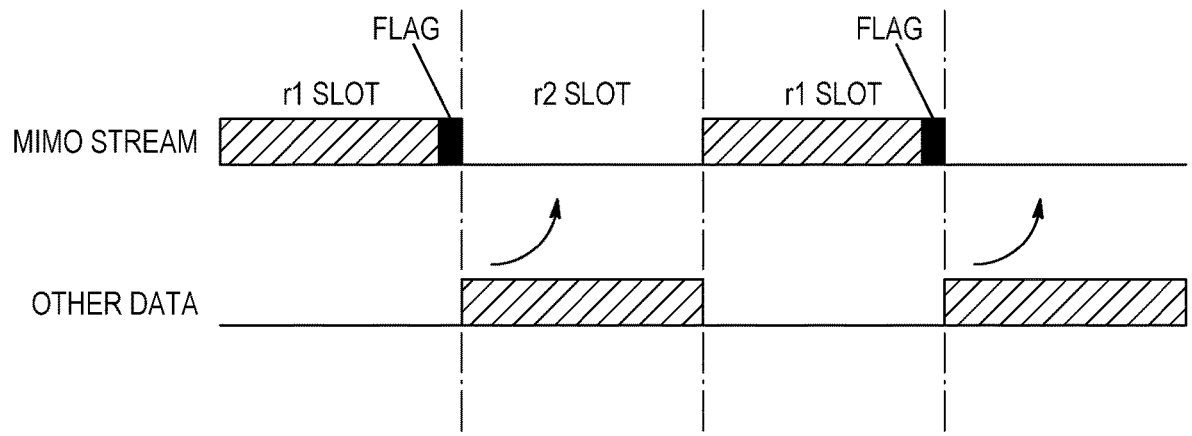
FIG. 6 is a timing diagram for serial data transmission in accordance with one embodiment of the invention.

Turning now to FIG. 6, a time slot for sending other data to replace the r2 signal stream is illustrated. Specifically, the stream sent on the serial link 42 will have suitable slots for the r1 signals and r2 signals. To replace the r2 signals during high correlation, the other data is slotted into the empty r2 slots. The signal streams r1 and r2 may be parallel samples, but also alternatively, might be serial samples as well. The processing controller 58 provides processing coefficients and settings, pursuant to the processing of the signals, such as indicated by line 90. When the processed signal r1 is sent, the processing coefficients/settings 90 are then communicated and multiplexed onto the combined serial data stream by the multiplexer circuitry 80 along with the flag information 74. Alternatively, the signal r1 might be sent unprocessed. To that end, a switch 59 might be implemented to provide the unprocessed r1 signal to the delay block 62, rather than the processed signal r1. Switch 59 may be appropriately controlled depending upon the version of the signal r1 to be sent.

Turning now to FIG. 4B on the opposite side of the serial link from the front end circuitry, the back end circuitry 44, at anther DAS endpoint, recovers the original signals from the combined serial data stream on digital data link 42. Back end circuitry 44 might be implemented, for example, in a remote antenna unit. As noted, it would be readily understood by a person of ordinary skill in the art, that the signal path illustrated in FIGS. 4A and 4B, such as for a downlink signal direction, will be effectively duplicated at the endpoints, such as the master unit and the remote antenna unit, for the purposes of handling the uplink signals, such as the signals from the user equipment 14 to the base station 12. Only a single signal path direction is illustrated in FIGS. 4A and 4B for discussion purposes.

At the back end circuitry 44, the original signals must be recovered. The combined serial data stream is directed by link 42 into suitable TDM de-multiplexer circuitry 92. The control flag information 74 is detected, and used to control how the second signal stream r2' is derived. The flag information 74 is directed to controller circuitry 94 that may be utilized to control switching circuitry 96 for directing the signal paths to the suitable processing circuitry 98, or to a receiver 100 when the combined serial data stream includes "other" data than just the MIMO signal streams. When the correlation circuitry 60 detects high correlation and the flag is set, controller 94 controls the switch circuitry 96 so that the second signal stream r2' is derived from the first signal stream r1. The signal path for the r1 signal is directed to the processing circuitry 98 for both paths. The combined serial data stream on link 42 also includes the processing coefficients and settings 90 that are directed by the de-multiplexing circuitry 92 to processing controller circuitry 102. The first and second signal streams are then processed by the suitable processing circuitry 98 to invert the processing that occurred in the front end circuitry, as illustrated in FIG. 4A. The processing controller 102 receives the processing coefficients and processing settings via the combined serial data and sets the coefficients for each of the processing circuitry blocks 98. Preferably, the output of each of the processing blocks r1' and r2' will be as close as possible to the original MIMO signal streams r1 and r2. In one example of the invention, the processing circuitry 98 might include an adaptive filter that employs minimization of error algorithms, such as least mean square (LMS) or recursive least squares (RLS), or other signal processing techniques.

At the same time, in a high correlation condition, the flag information 74 will indicate that other data was sent in the combined serial data stream. The switch circuitry 96 that directs the r1 signal to be used to construct the r2' signal will also direct the de-multiplexed other data from circuitry 92 to the receiver 100, where it is further processed. That is, the output path from de-multiplexer circuitry 92 normally used for the second signal r2 is directed to the receiver 100 for processing the other data that is in the slots reserved for the r2 signal.

Alternatively, if no flag 74 is set and there was not high correlation detected in the front end circuitry 44, then other data priorities might be utilized. For example, in one embodiment, for those situations where there is not a high correlation between the r1 and r2 signals, no flag would be set and the r1 and r2 signals are both sent over the serial link. That is, there is no other data that would be sent in the slot normally reserved for the r2 signal. In one embodiment, the switches 59 are set so that processed versions of signals r1, r2 are sent. In such a case, processing settings may be sent as well. In another embodiment, based on the switch settings for switch 59, unprocessed versions of r1, r2 are sent on the serial link. The separate r1, r2 signals are handled separately and are directed through the respective paths to be further transmitted. If processed versions of r1, r2 are sent, they will be processed individually by the processing circuitry 98. If unprocessed versions of the signals r1, r2 are sent, the processing circuitry 98 will pass those signals generally unmodified.

In an alternative embodiment, even if there is not a high correlation between the signals r1 and r2, the other data still might be sent. That is, the other data may still get priority and thus could be sent on the serial link rather than the r2 signal. For example, the processing circuitry might control the process and other circuitry to then send flag information or set a flag even in a low correlation or uncorrelated scenario and might control the necessary switching circuitry in order to send the other data rather than the r2 signal. In that way, the system user has the ability to configure the priority of which data gets sent in the uncorrelated case. In one scenario, in the uncorrelated case, both signals r1 and r2 (e.g. full MIMO signals) might be given priority, and in another scenario, the other data might be given priority.

Once the signals are recovered as r1' and r2', they are directed to be further processed and/or transmitted. For example, the signals might be directed as digital signals to suitable digital signal processing circuitry (not shown). Alternatively, the signals might be converted to RF and further transmitted, such as over a wireless interface. To that end, optional circuitry on the back end transmission side, as illustrated in FIG. 4B, might include D/A circuitry 104 to convert the digital signals to analog signals, provide any digital upconversion, digital interpolation, and/or filtering. For wireless transmission, frequency conversion circuitry 106 may be utilized to upconvert the signal to a suitable RF frequency where they may then be transmitted through multiple MIMO antennas 110.

In an alternative embodiment of the invention, as illustrated in FIGS. 4A and 4B, the similarities between the signals r1 and r2 might be evaluated and determined by looking at an output from the processing stage. That is, processing controller 58 in the processing circuitry 56 may determine an error signal or difference signal between the processed signals r1 and r2. The level of the error or difference signal indicates the similarity between the signals r1 and r2. To that end, processing controller 58 might be coupled directly with the threshold detector circuitry 64, such as by control lines 63. The processing controller 58 would provide the error signal which may be used for creating a difference value for comparison to a particular threshold by the threshold detector circuitry. If the difference value level is below a particular threshold setting, indicating that the signals r1 and r2 are significantly similar, then the flag 74 is set and only one of the signals, such as r1, is sent along with other data 82, as discussed hereinabove. If the difference value exceeds a threshold level indicating significantly different signals r1, r2, the flag is not set. As such, processing steps for determining the similarities of the signals might include other processing rather than just correlation processing.

Figure 7:
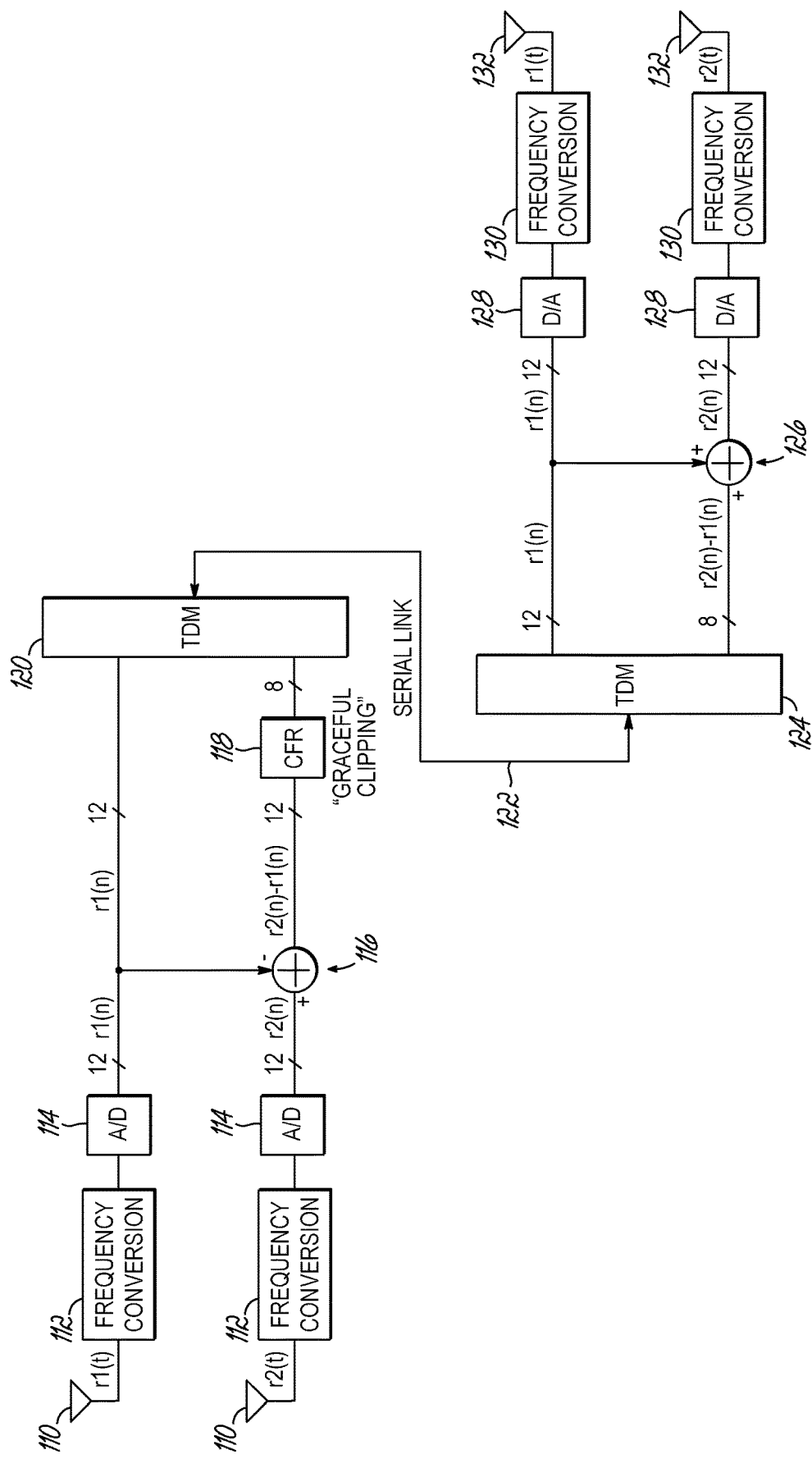
FIG. 7 is s block diagram of a DAS system for one embodiment of the invention.

FIG. 7 illustrates an alternative embodiment of the invention and illustrates a signal path in a DAS system that implements subtraction of at least part of a first MIMO signal r1 from a second MIMO signal r2, to compress that modified signal prior to transmission to the TDM multiplexer circuit to time-division multiplex the signal onto a serial data link. As noted above, the signal path of FIG. 7 may be indicative of a downlink path from a DAS master unit to a remote antenna unit or an uplink path from the remote antenna unit to a master unit.

In this scheme the received MIMO signals r1 and r2, such as a signal received by an appropriate link like antenna 110, are frequency downconverted by circuitry 112 and converted to digital signals by A/D circuitry 114. To take advantage of correlated signals, signal r1 is subtracted from received MIMO signal r2. The second input into the TDM multiplexer circuitry 120 is the difference between r1 and r2, as determined by processing circuitry 116. If the two signals are highly correlated, the difference between signal r1 and r2 would allow for a reduced amount of dynamic range to be used in the second MIMO stream to represent the signal. In this simple example, the link will require (12+8)*100 MHz=2 Gbps. Occasionally the signals may be highly decorrelated and require more dynamic range than is allowed by the serial link. In this case Crest Factor Reduction (CFR) circuitry 118, and in particular CFR circuitry that utilizes "graceful" clipping, can be used to reduce the nonlinearity effects of a hard limiter. In this manner, the benefits of MIMO may be achieved without sending the redundant information down the serial link 122, thus reducing the serial data. As may be appreciated, circuitry as illustrated in FIG. 7 might only be implemented after it is determined that the signals are highly correlated, as discussed with respect to FIGS. 4A, 4B. FIG. 7 does not illustrate the circuitry for determining correlation.

The reduced serial link is then received by suitable TDM de-multiplexing circuitry 124, wherein the signals are then separated to reconstruct the MIMO signals r1 and r2. To that end, the difference signal that was transmitted is added to the original MIMO signal r1 by appropriate circuitry 126 to reconstruct the signals r1 and r2. The digital signals may then be converted to analog signals by appropriate circuitry 128, and then upconverted to a suitable RF signal by a frequency conversion circuitry 130, and then transmitted by suitable antennas 132. Of course, the resulting signals might also be processed or transmitted in another fashion.

Figure 8A:
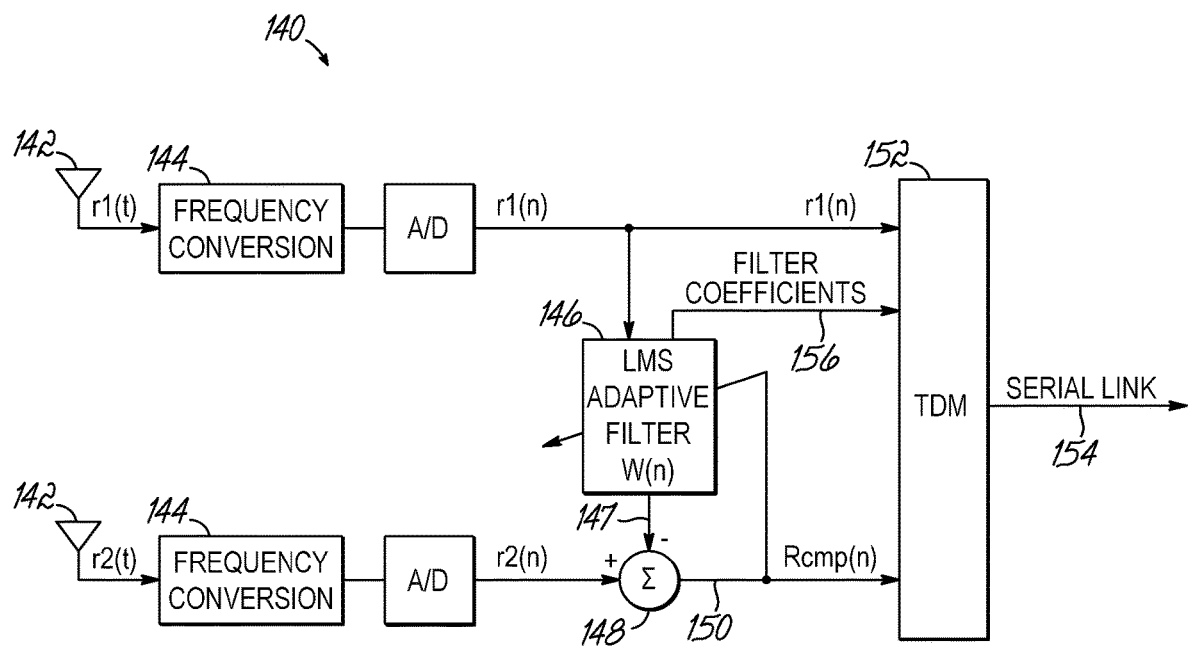
FIGS. 8A and 8B are block diagrams of endpoints of a DAS system in accordance with another embodiment of the invention.
Figure 8B:
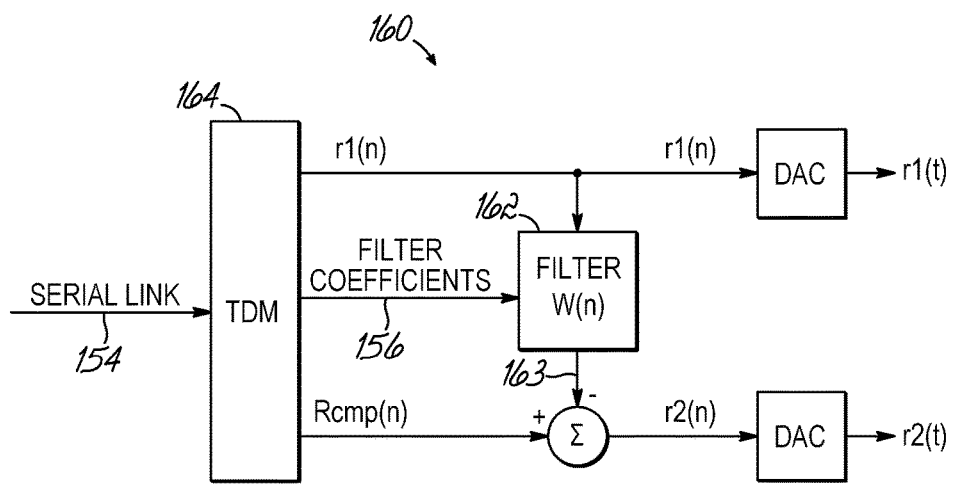

FIGS. 8A and 8B illustrate a further alternative embodiment of the invention utilizing data reduction for one or more correlated MIMO signals for the purposes of reducing a serial data rate on a serial link between endpoints in a digital distributed antenna system. To that end, MIMO signals might be received by front end circuitry 140, such as RF signals that are captured by suitable antennas 142. The signals might then be downconverted by appropriate frequency conversion circuitry 144, and then converted to digital signal r1 and r2, as illustrated. Alternatively, as discussed above, the signals might be delivered directly to the front end circuitry 140 as digital signals.

The digital signals r1, r2, and specifically the combined serial data stream might be reduced utilizing adaptive filtering and signal subtraction, as illustrated in FIG. 8A.

Specifically, the received MIMO signal r1 is directed to an adaptive filter 146. Adaptive filter 146 may be an adaptive LMS filter, for example. The filtered r1 signal 147 is then subtracted by suitable circuitry 148 from the other received MIMO signal r2. The resulting compressed signal 150 is used as feedback to the adaptive filter 146 for adaptation. The resulting signal indicated as Rcmp (n) is a compressed signal, as indicated by Equation 1:

$$Rcmp(n)=r2(n)-W(n)*r1(n)$$

Adaptive filter 146 utilizing the feedback signal Rcmp(n) will adjust its filter coefficients in order to try to minimize the resulting Rcmp(n) signal. The compressed signal Rcmp (n), as well as the original MIMO signal r1 and the filter coefficients 156 of the adaptive filter 146, are then directed to suitable TDM multiplexing circuitry 152, and are multiplexed into a combined signal to be sent on serial data link 154. The compressed signal Rcmp(n) requires fewer bits to transmit than the original MIMO signal r2 due to the smaller amplitude of Rcmp(n). The filter coefficients 156 from the adaptive filter 146 are relatively slow changing, and thus, can be updated at a somewhat slow rate through the serial data link 154, and the multiplexing circuitry 152.

FIG. 8B illustrates back end circuitry 160 coupled with the front end circuitry 140 by the serial data link 154. As noted, back end circuitry will be in a DAS endpoint component. To reconstruct the original MIMO signals, a configurable filter 162 is coupled to receive the original MIMO signal r1, as well as the filter coefficients 156 from the multiplexing circuitry 164. The configurable filter 162 processes the MIMO signal r1 with the filter coefficients 156, and the resulting signal 163 is added to the compressed signal Rcmp(n) in order to recreate the original MIMO signal r1. The resulting digital signals can then be converted back to analog signals and otherwise transmitted over a wireless or wired medium from the DAS system to other components, whether that is a base station or user equipment.

Figure 9A:
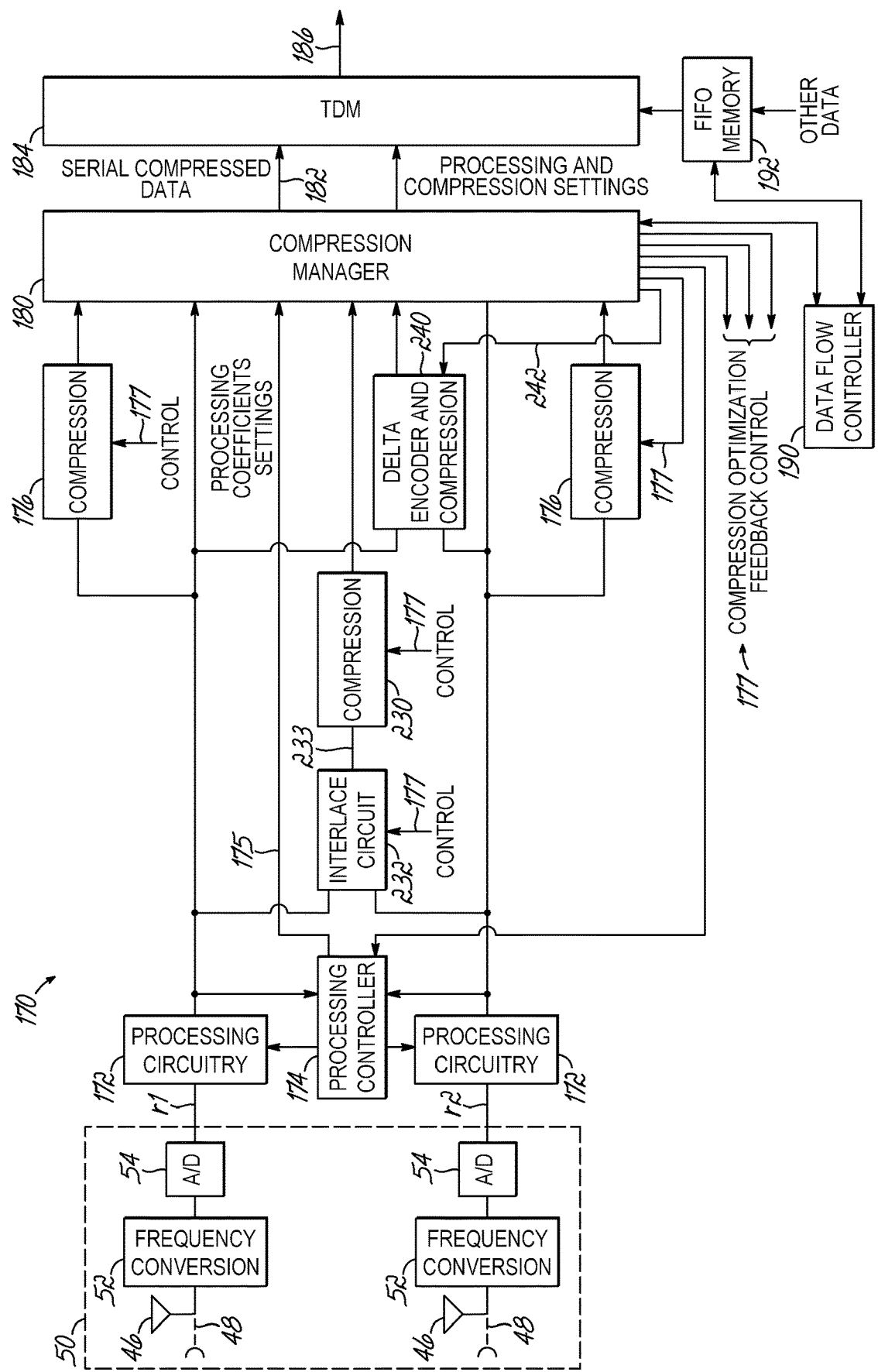
FIGS. 9A and 9B are block diagrams of endpoints of a DAS system in accordance with another embodiment of the invention.
Figure 9B:
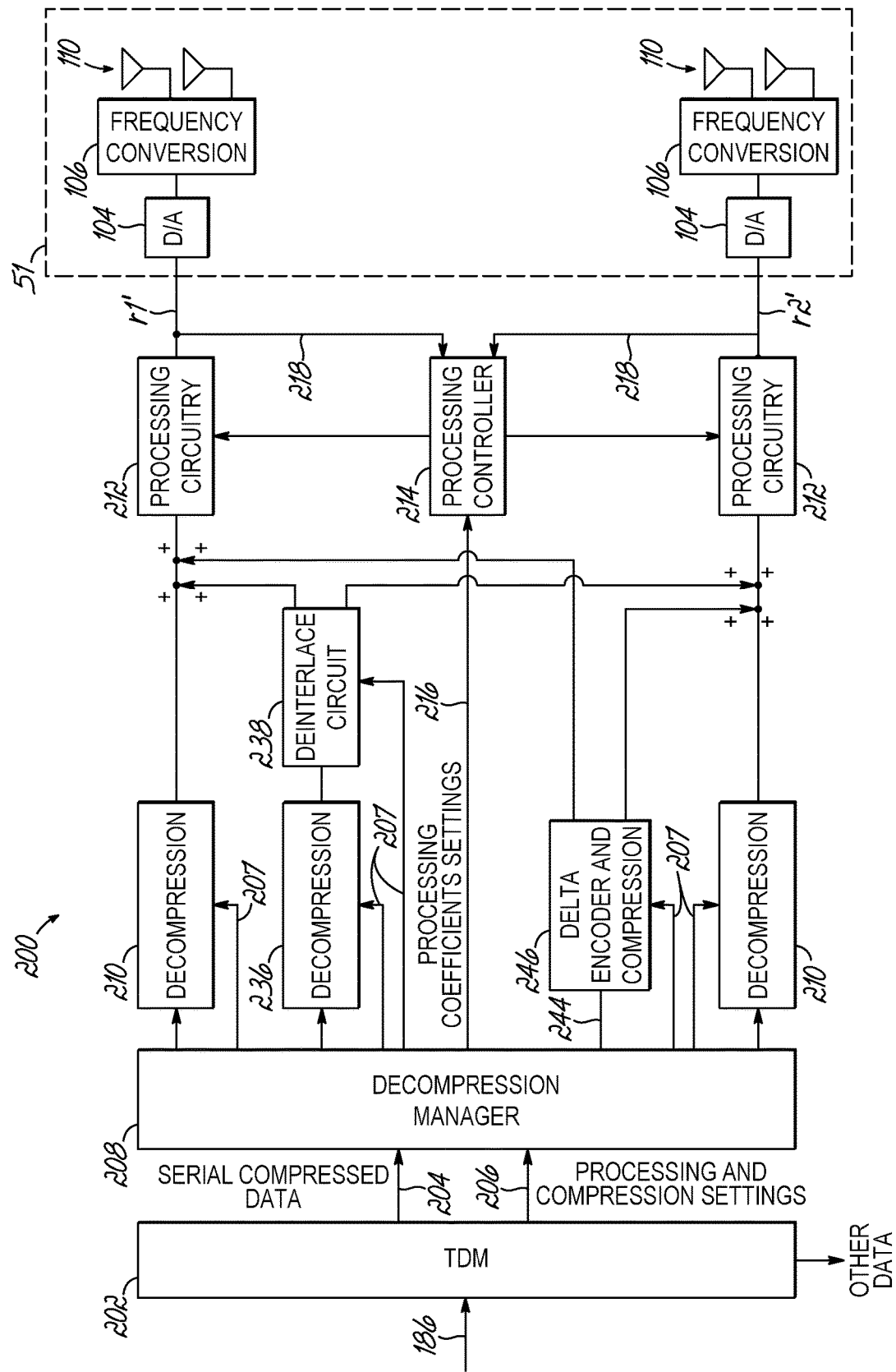

FIGS. 9A and 9B illustrate further embodiments of the invention illustrating the signal path between endpoints of a digital DAS system using compression to improve data flow through. As illustrated in FIG. 9A, digital MIMO signal r1 and r2 are delivered to front end circuitry 170 for further processing in accordance with aspects of the invention. Specifically, the signal compression exploits the similarities or correlation between multiple MIMO streams, such as the two MIMO streams r1 and r2, in order to reduce the amount of data sent over a combined serial data stream in a suitable serial link. Each of the digital signals r1 and r2 is delivered to suitable processing circuitry 172. That processing circuitry may incorporate a fixed bandwidth filter, and an adaptive filter, or more complex processing stage. As noted herein, the signals r1, r2 may be digital signals, or might be captured as analog signals or RF signals by endpoint front end circuitry 50, such as antenna 46 or direct links 48 to a BTS, and further processed as necessary to be presented as digital signals.

The processing circuitry 172 is controlled by processing controller circuitry 174. The primary purpose of the processing circuitry 172 is to condition the individual data streams r1 and r2 for optimal compressing. For example, the amplitude and phase of the signals might be scaled in order to scale the signal streams toward each other to achieve a maximum correlation peak. The processing controller circuitry 174 also provides output processing coefficients and settings 175 to compression manager circuitry 180. FIGS. 9A and 9B illustrate several compression schemes and circuits which may be utilized in achieving the invention. While the different compression schemes and their circuitry components are discussed herein with respect to FIGS. 9A and 9B, it is not necessary that all such compression schemes be implemented together. Rather, each of the noted compression schemes might be implemented individually, according to the invention. Also, one or more of the compression schemes might be implemented together with another compression scheme.

In one exemplary compression scheme for the embodiment of the invention illustrated in FIGS. 9A and 9B, one or more of the signal streams r1 and r2 may be compressed individually. As illustrated in FIG. 9A, compression circuitry 176 positioned in each signal path will receive the r1 and r2 data streams. The compression circuitry 176 is coupled to suitable compression manager circuitry that contains the necessary processing circuitry for controlling the compression schemes and compression circuitry. The compression manager circuitry provides one or more control signals 177 to the compression circuitry 176. The compression manager circuitry 180 verifies the amount of compression that is achieved for the various data streams r1 or r2. The compression manager circuitry 180 also selects the most efficient compression scheme that might be used if there are multiple compression schemes available. At the same time, the compression manager circuitry 180 controls and optimizes the compression algorithm used for each scheme, such as utilized in the compression circuitry 176. The outputs of the compression circuitry 176 for each of the data streams r1 and r2 are fed to the compression manager circuitry 180. The output 182 of the compression manager circuitry is then the serial data of compressed and combined signals for the various MIMO signal paths. The serial data output is fed into TDM multiplexer circuitry 184. The compression manager circuitry also outputs compression settings that are combined with the processing coefficients and settings and are also fed to the multiplexing circuitry 184 to be combined over the serial link 186 as a combined serial data stream.

Based on the compression provided, there may be additional slots available in the combined serial data stream for providing other data. To that end, data flow controller circuitry 190 may be suitably and operably coupled with the compression manager circuitry 180 to manage the compression controller circuitry, and also to manage and adjust the amount of "other" data that might be combined under the combined serial data stream, such as through the FIFO memory element 192 or other buffer, as illustrated in FIG. 9A. Additional data may be placed into available slots, as discussed above with respect to the other embodiments. The combined serial data stream on serial data link 186 is then directed to the other endpoint of the path, and must be recovered and decompressed back to the original MIMO signals r1 and r2 for further processing.

Turning now to FIG. 9B, back end circuitry 200 is illustrated at a DAS endpoint for decompressing and recovering the signal streams r1 and r2. For each compression scheme, as discussed above and discussed further hereinbelow, the suitable decompression scheme must be implemented on the back end, and thus, decompression circuitry components are coupled in the signal paths for providing such decompression. Specifically, the serial data link 186 is directed to suitable TDM de-multiplexer circuitry 202. The de-multiplexing circuitry 202 may separate out any "other" data that was sent over the serial link in the combined serial data stream. The MIMO signal data is then directed on separate signal paths for decompression. That is, path 204 will contain the multiplexed serial compressed data, while path 206 contains the processing coefficients and settings and compression settings provided from the front end circuitry 170. Those signals are directed to decompression manager circuitry 208. The decompression manager circuitry provides compression settings 207 as appropriate to the decompression circuitry and controls the individual decompression circuitry in a way that corresponds to the compression circuitry implemented in the front end circuitry 170. Decompression manager circuitry 208 will control each of the decompression circuitry components, depending upon the compression settings and other parameters provided by the compression manager circuitry 180.

For the embodiment discussed herein involving individual compression of each of the signal paths r1 and r2, the decompression manager circuitry 208 directs the serial compressed data to decompression circuits 210, along with the necessary compression settings 207 in order to provide the desired decompression of the data. Decompressed data is then directed to suitable processing circuitry 212 that is controlled by processing controller circuitry 214 utilizing the processing coefficients and settings that were provided by the front end circuitry in the combined serial data streams. As noted, decompression manager circuitry 208 outputs the suitable processing coefficients and settings 216 that are implemented by the processing controller for controlling processing circuitry 212 to again provide the decompressed and reconstructed signals r1' and r2'. Suitable feedback signals 218 are also provided to the processing controller 214 as necessary for processing. Once the MIMO signals r1' and r2' are recovered, they may be forwarded further along the path and transmitted, or otherwise proposed, as desired at the endpoint of the DAS system. For example, they may be provided by a wired or wireless link, such as to a base station or to user equipment, depending upon whether the signal path of FIGS. 9A and 9B is implemented in the uplink or the downlink direction. Suitable circuitry 51 might be used with the backend circuitry 200 for further signal transmission.

As noted above, multiple compression schemes might be implemented, as illustrated in FIGS. 9A and 9B. Although only one scheme generally will be active at a time, alternative embodiments of the invention might incorporate multiple compression schemes that are utilized in parallel. If multiple compression schemes are provided, the decompression manager circuitry 208 is configured to introduce suitable delays in the signals to equalize the potentially different delays that the signals will experience in each decompression scheme. The processing stage provided by circuits 212 and 214 will follow any of the decompression stages to essentially invert the processing that occurred in the front end circuitry 170.

Referring again to FIG. 9A, an alternative compression scheme is illustrated by compression circuitry 230 and an interlace circuitry 232. Specifically, the signal streams r1 and r2 are directed to the interlace circuitry 232. The interlaced stream 233 is then provided to compression circuitry 230, both under the control of the compression manager 180. That combined and compressed signal is then directed to the compression manager and output to the multiplexer circuitry 184, along with the various processing and compression settings. Compression optimization through circuitry 230 is provided by the compression manager circuitry through appropriate control lines 177.

The combined serial data stream is then provided to the back end circuitry 200 over serial data link 186. Once the signals are de-multiplexed and provided to the decompression manager circuitry 208, the interlaced signal is then provided through appropriate decompression circuitry 236, and de-interlace circuitry 238 for again separating the signals into separate paths. After processing through processing circuitry 212, the signals r1' and r2' are presented for further transmission in the DAS system.

FIGS. 9A and 9B disclose another alternative compression scheme. Referring to FIG. 9A, circuitry 240 provides delta encoding and compression in which the difference between the two signal streams r1 and r2 is encoded and then compressed. The compression manager circuitry 180 will verify the amount of compression achieved, and select the most efficient compression scheme through appropriate control signals 242. The compressed signal is then provided through the compression manager circuitry 182, multiplexing circuitry 184, and delivered to the back end circuitry 200, as illustrated in FIG. 9B. Once the signal is demultiplexed and provided through the decompression manager circuitry 208, signal 244 is directed to circuitry 246 for delta decoding and decompressing the signal. After that decompression, through further processing in the processing circuitry 212, the decompressed and reconstructed MIMO signals r1' and r2' are delivered for further transmission in the DAS system.

Embodiments of the invention are not limited to MIMO applications. For example, the invention would provide benefits for diversity systems as well. Embodiments of the invention thus, use mechanisms that provide compression of the digitized signals in a way that reduces the required serial link data rate between the endpoints, like the MU and the RAUs in a DAS system.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An endpoint element of a distributed antenna system having multiple endpoints coupled together by serial data links, comprising:
    processing circuitry configured to process a plurality of digital signals including a first digital signal corresponding to a first signal received on a first signal path and a second digital signal corresponding to a second signal received on a second signal path separate from the first signal path, wherein the processing circuitry includes adaptive filtering circuitry configured to filter the first digital signal to produce a filtered first digital signal;
    circuitry configured to determine a difference signal that is reflective of a difference between the second digital signal and the first filtered digital signal; and
    circuitry configured to transmit the first digital signal and the determined difference signal to a second endpoint of the distributed antenna system having multiple endpoints over a serial data link.

2. The endpoint element of claim 1, wherein the adaptive filtering circuitry comprises one of:
    a least mean square filter; or
    a recursive least squares filter.

3. The endpoint element of claim 1, wherein the determined difference signal is provided as feedback to the adaptive filtering circuitry, wherein the adaptive filtering circuitry is configured to adjust filter coefficients based on the determined difference signal.

4. The endpoint element of claim 3, wherein the adaptive filtering circuitry is configured to adjust the filter coefficients to minimize the determined difference signal.

5. The endpoint element of claim 1, wherein the processing circuitry configured to process a plurality of digital signals is configured to generate filter coefficients when filtering the first digital signal,
wherein the circuitry configured to transmit the first digital signal and the determined difference signal is configured to transmit the filter coefficients to the second endpoint over the serial data link.

6. The endpoint element of claim 1, wherein the first digital signal and the second digital signal comprise one of Multiple-Input Multiple-Output (MIMO) signals or diversity signals.

7. A distributed antenna system, comprising:
a first endpoint of the distributed antenna system including:
processing circuitry configured to process a plurality of digital signals including a first digital signal corresponding to a first signal received on a first signal path and a second digital signal corresponding to a second signal received on a second signal path separate from the first signal path, wherein the processing circuitry includes adaptive filtering circuitry configured to filter the first digital signal to produce a filtered first digital signal;
circuitry configured to determine a difference signal that is reflective of a difference between the second digital signal and the first filtered digital signal; and
circuitry configured to transmit the first digital signal and the determined difference signal over a serial data link; and
a second endpoint of the distributed antenna system including:
circuitry configured to receive the first digital signal and the determined difference signal from the serial data link; and
circuitry configured to reconstruct the second digital signal from the first digital signal and the determined difference signal.

8. The distributed antenna system of claim 7, wherein the processing circuitry configured to process a plurality of digital signals is configured to generate filter coefficients when filtering the first digital signal,
wherein the circuitry configured to transmit the first digital signal and the determined difference signal is configured to transmit the filter coefficients to the second endpoint over the serial data link.

9. The distributed antenna system of claim 8, wherein the circuitry configured to reconstruct the second digital signal from the first digital signal and the determined difference signal is configured to derive the second digital signal using the first digital signal, the determined difference signal, and the filter coefficients.

10. The distributed antenna system of claim 9, wherein the circuitry configured to reconstruct the second digital signal from the first digital signal and the determined difference signal comprises a configurable filter.

11. The distributed antenna system of claim 10, wherein the configurable filter is configured to:
generate another filtered first digital signal by filtering the first digital signal received from the serial data link using the filter coefficients; and
generate the second digital signal by adding the another filtered first digital signal to the determined difference signal.

12. The distributed antenna system of claim 7, wherein the first digital signal and the second digital signal comprise one of Multiple-Input Multiple-Output (MIMO) signals or diversity signals.

13. The distributed antenna system of claim 7, wherein the determined difference signal is provided as feedback to the adaptive filtering circuitry, wherein the adaptive filtering circuitry is configured to adjust filter coefficients based on the determined difference signal.

14. The distributed antenna system of claim 13, wherein the adaptive filtering circuitry is configured to adjust the filter coefficients to minimize the determined difference signal.

15. A method of transmitting digital data between endpoints of a distributed antenna system, comprising:
processing a plurality of digital signals at one endpoint of the distributed antenna system including a first digital signal corresponding to a first signal received on a first signal path and a second digital signal corresponding to a second signal received on a second signal path separate from the first signal path;
filtering the first digital signal using an adaptive filter to produce a filtered first digital signal;
determining a difference signal that is reflective of a difference between the second digital signal and the first filtered digital signal; and
transmitting the first digital signal and the determined difference signal to a second endpoint of the distributed antenna system over a serial data link.

16. The method of claim 15, further comprising:
providing the determined difference signal as feedback to the adaptive filter; and
adjusting filter coefficients of the adaptive filter based on the determined difference signal.

17. The method of claim 16, wherein adjusting filter coefficients of the adaptive filter based on the determined difference signal comprises adjusting the filter coefficients to minimize the determined difference signal.

18. The method of claim 15, further comprising generating filter coefficients when filtering the first digital signal and transmitting the filter coefficient to the second endpoint over the serial data link.

19. The method of claim 15, further comprising, at the second endpoint:
generating another filtered first digital signal by filtering the first digital signal using a configurable filter; and
deriving the second digital signal by adding the determined difference signal to the another filtered first digital signal at the second endpoint.

20. The method of claim 15, wherein the first digital signal and the second digital signal are one of multiple-input multiple-output (MIMO) signals or diversity signals.

* * * * *